W. S. THOMSON.
PROCESS OF MAKING THREADED TOOL MEMBERS AND BLANKS FOR THE SAME.
APPLICATION FILED JAN. 5, 1914.
1,118,073.
Patented Nov. 24, 1914.
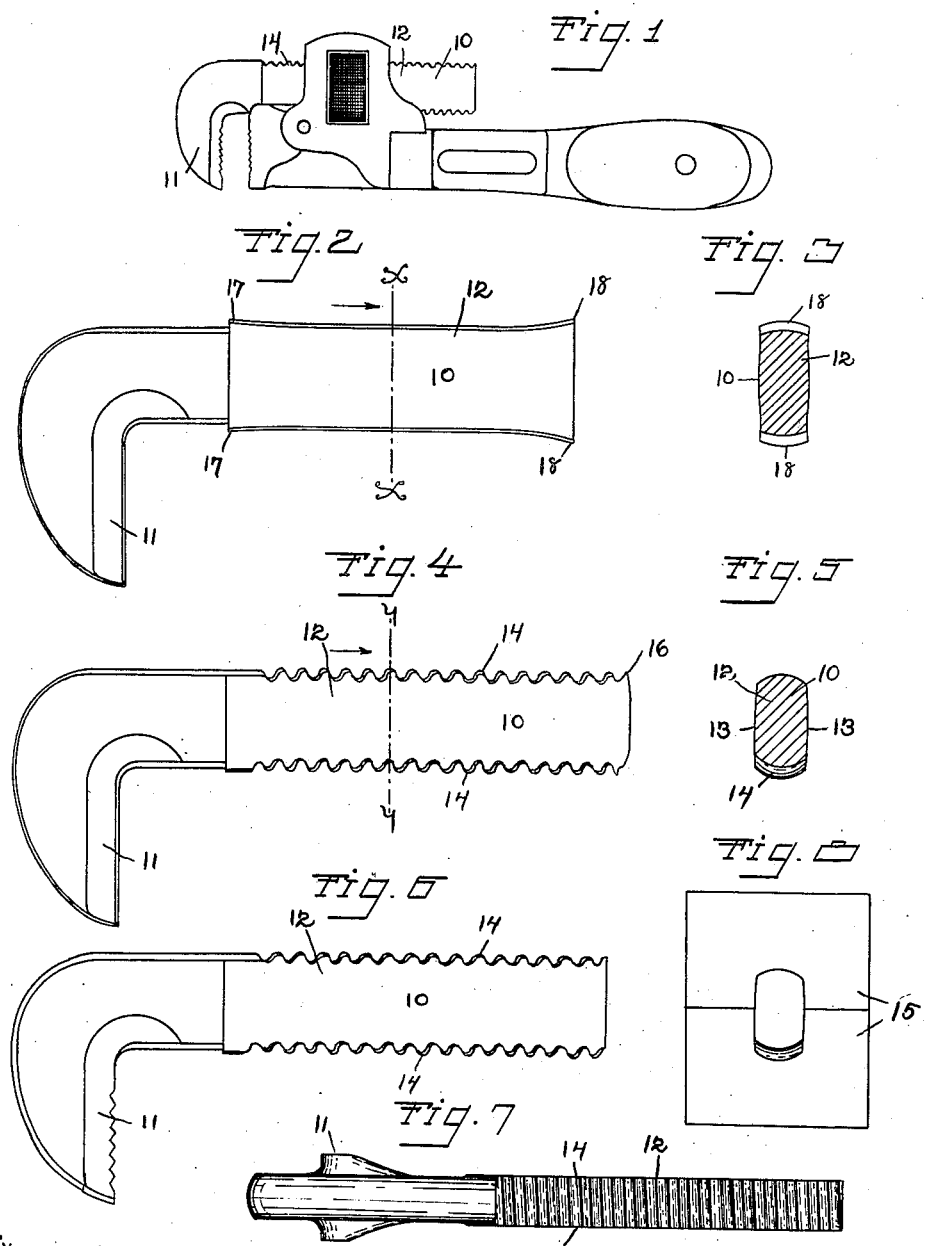

UNITED STATES PATENT OFFICE.

WILLIAM S. THOMSON, OF PLANTSVILLE, CONNECTICUT, ASSIGNOR TO THE H. D. SMITH & COMPANY, OF PLANTSVILLE, CONNECTICUT, A CORPORATION.

PROCESS OF MAKING THREADED TOOL MEMBERS AND BLANKS FOR THE SAME.

1,118,073.   Specification of Letters Patent.   Patented Nov. 24, 1914.

Application filed January 5, 1914. Serial No. 810,384.

*To all whom it may concern:*

Be it known that I, WILLIAM S. THOMSON, a citizen of the United States, residing at Plantsville, in the county of Hartford and State of Connecticut, have invented certain new and useful Improvements in Processes of Making Threaded Tool Members and Blanks for the Same, of which the following is a specification.

My invention relates to improvements in threaded tool members and the object of my improvement is to form the threads on the shanks of tool members such as the moving member of a pipe wrench and similar articles by the drop forging process.

In the accompanying drawing:—Figure 1 is a side elevation of a pipe wrench having a moving member made by my improved process. Fig. 2 is a similar view on an enlarged scale of the blank for the moving member shown in Fig. 1 in the condition just previous to having the thread formed thereon. Fig. 3 is a sectional view on the line $x$ $x$ of Fig. 2. Fig. 4 is a side elevation of the blank shown in Fig. 2 after being operated on for forming the thread. Fig. 5 is a sectional view on the line $y$ $y$ of Fig. 4. Fig. 6 is a side elevation of the finished moving tool member. Fig. 7 is a plan view of the same. Fig. 8 is an end elevation of the dies.

In Fig. 1 is shown a pipe wrench having a moving member 10 made by my improved process. The said moving member 10 has a jaw 11 at one end and an elongated shank 12 at the other end, and the said shank has substantially flat sides 13 and an interrupted thread 14 extending along the upper end lower edges.

The blank as shown in Fig. 2 in the condition just previous to the formation of the thread is formed by the drop forging process and comprises the jaw 11, which is ordinary, at one end and the shank 10 at the other end and which comprises special features to be described. The thread 14 is formed by means of two part dies 15 on the shank 10, the blank being in heated condition when first operated on. One of the effects of the pressure of the dies 15 is to elongate the shank 10, so that in order to have the threaded shank of the proper full cross section surplus material is provided in the cross section of the blank, as is usual in the drop forging operation. The special features that are provided for the shank that are referred to have special reference to providing means for effecting the formation of the complete and full thread for the entire length of the finished shank.

The shank 10 as shown in Fig. 4 is in the condition after operation of the dies; is elongated as mentioned; and comprises adjacent the free end a false thread 16, which is of no practical use and is preferably cut off.

In Fig. 6 is shown the finished shank after trimming off the false thread 16. In order to provide for a proper filling of the interstices of the dies 15 to form full and complete teeth for the desired effective length of the shank or shank proper I provide on the shank 10 in the blank as shown in Fig. 2 enlargements 17 and 18 at the ends of the said shank proper along the upper and lower edges. The enlargements 17 and 18 are made a maximum at the ends of the shank proper and taper off toward the middle body portion.

In the die forging operation the die is engaged first with these enlargements and are embedded therein and thereby insure the formation of full teeth at the ends, and they also coöperate with the dies along the intermediate body portion in that they operate as ties or anchors to hold the metal from running away from the top and bottom edges as the dies are closed. That is, while the axial portion of the shank may and does run under the pressure to which the shank is subjected, the metal along the upper and lower edges is held suitably to receive the full impression of the dies. By using closed dies, having the portion opposed to the free end of the shank closed part of the running effect mentioned can be avoided. I prefer however to use open ended dies, as shown, and permit the free end to run, and trim the tip end off as described. In order to permit of using such open ended dies and insure a full thread at the free end of the shank proper I form the enlargements 18 at the free end appreciably larger than the enlargements 17 at the jaw end of the shank as shown. The thread 14 as described is formed when the metal is heated, and accordingly elongated as is well understood, relatively to the length in the finished and cold condition. It is possible to make allowance for this elongation, or the shrinkage, in the formation of the thread in the dies 15. I prefer however to make the thread in the dies 15 correspond to the pitch of the finished thread, without any such allowance, for convenience in manufacture. The thread formed by the use of such dies will of course differ slightly from the proper and correct thread, but will answer in many cases, without further treatment. In other cases, in which the correct thread is desired, I prefer to correct the thread by another operation, and by the use of the same or similar dies 15 when the shank is cold. That is to say considering the shank 10 having the thread 14, shown in Fig. 4, this thread was formed when the metal was heated, so that when cooled to atmospheric temperature, the said thread would be incorrect in length by an amount approximately one eighth of an inch to a foot. By subjecting the said shank 10 while cold to the dies 15 the thread is corrected, the shank being elongated the proper amount. The thread 14 in the finished article is left in the state as it comes from the dies, no finishing operation being applied thereto, so that an inspection of the shank 10 will show that the article was made by the die forging or drop forging process.

I claim as my invention:—

1. The process of forming a thread along the edges of the shank of a tool member consisting of subjecting the said shank to pressure in dies, and the said shank having a greater cross section at the ends corresponding to the ends of the said thread relatively to the intermediate body portion of the said shank suitably to engage with the said dies at said ends of the thread previous to the engagement of the said dies with the said intermediate body portion.

2. The process of forming a thread along the edges of the shank of a tool member and which thread extends along the body portion of the said shank and to the free end thereof consisting of providing a shank having a free end, and subjecting the said shank to pressure in dies, and the said shank having a maximum cross-section adjacent the said free end suitably to engage with the said dies previously to the engagement of the said dies with the other portions of the said shank.

3. The process of forming the thread along the edges of a tool shank by subjecting the said shank to pressure in dies, and which shank has a free end, which consists in providing a blank for the said shank having a free end, and subjecting the said shank to pressure in dies, and the said shank having a greater cross section adjacent the ends of the desired thread than the intermediate body portion and having a maximum of cross section adjacent the said free end so that the said dies will engage with the said shank successively and in order, first adjacent the said free end, then adjacent the other end of the said thread, and finally at the said intermediate body portion.

4. A blank for a shank for a tool member suitable for having a thread formed thereon in dies and having excess of width of cross section adjacent the ends of the desired finished thread.

WILLIAM S. THOMSON.

Witnesses:
GEO. R. BOND,
E. H. GALPIN.